United States Patent
Morris et al.

(10) Patent No.: US 7,464,280 B2
(45) Date of Patent: Dec. 9, 2008

(54) POWER MODULE FOR A PLURALITY OF PROCESSORS

(75) Inventors: Terrel L Morris, Garland, TX (US); Eric C. Peterson, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 377 days.

(21) Appl. No.: 11/158,430

(22) Filed: Jun. 22, 2005

(65) Prior Publication Data

US 2006/0294398 A1 Dec. 28, 2006

(51) Int. Cl.
*G06F 1/00* (2006.01)

(52) U.S. Cl. .................. 713/323; 713/300; 713/310; 713/320; 713/321; 713/322; 713/324; 713/330; 713/340

(58) Field of Classification Search .............. 713/300, 713/310, 320–324, 330, 340
See application file for complete search history.

(56) References Cited

U.S. PATENT DOCUMENTS 6,137,188 A * 10/2000 Mitchell et al. ............... 307/29
6,448,672 B1 * 9/2002 Voegeli et al. ................ 307/52
6,691,235 B1 * 2/2004 Garcia et al. ................ 713/300
7,085,943 B2 * 8/2006 Chun et al. .................. 713/300
2004/0215991 A1 * 10/2004 McAfee et al. .............. 713/324

OTHER PUBLICATIONS

Harris et al., "Redundant Power for Processor Circuit Board," U.S. Appl. No. 10/996,477, filed Nov. 24, 2004, 22 pp.
Belady et al., "Multi-chip Module with Power System and Pass-Thru Holes," U.S. Appl. No. 11/021,500, filed Dec. 21, 2004, 31 pp.
Belady et al., "Redundant Power Beneath Circuit Board," U.S. Appl. No. 11/059,189, filed Feb. 16, 2005, 30 pp.
Harris et al., "Multi-chip Module with Power System," U.S. Appl. No. 10/996,721, filed Nov. 24, 2004, 27 pp.
Harris et al., "Multi-chip Module with Stacked Redundant Power," U.S. Appl. No. 10/996,478, filed Nov. 24, 2004, 28 pp.
Belady et al., "Multi-Processor Module with Redundant Power," U.S. Appl. No. 11/061,156, filed Feb. 18, 2005, 28 pp.

* cited by examiner

*Primary Examiner*—Abdelmoniem Elamin

(57) ABSTRACT

In at least some embodiments, a multi-processor power module comprises components that are replicated at least for each of the plurality of processors. The multi-processor power module further comprises control logic that is configured to detect a demand from each of the plurality of processors and to direct the replicated components to provide a regulated power based on the demand, the regulated power being output for sharing among the plurality of processors.

18 Claims, 7 Drawing Sheets

POWER MODULE FOR A PLURALITY OF PROCESSORS

BACKGROUND

Processors of a computer or other electronic devices may need special power considerations. For example, the quality and response time of signals transmitted between a power module and a processor are relevant considerations. When implementing multiple processors in an electronic device, regulating power to each processor becomes more difficult and costly. This is due, at least in part, to the costs and the limited space associated with printed circuit boards (PCBs).

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Also, the term "component" is intended to mean a structural unit, element or constituent of a larger construction. A component may refer to hardware, software or a combination of hardware and software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
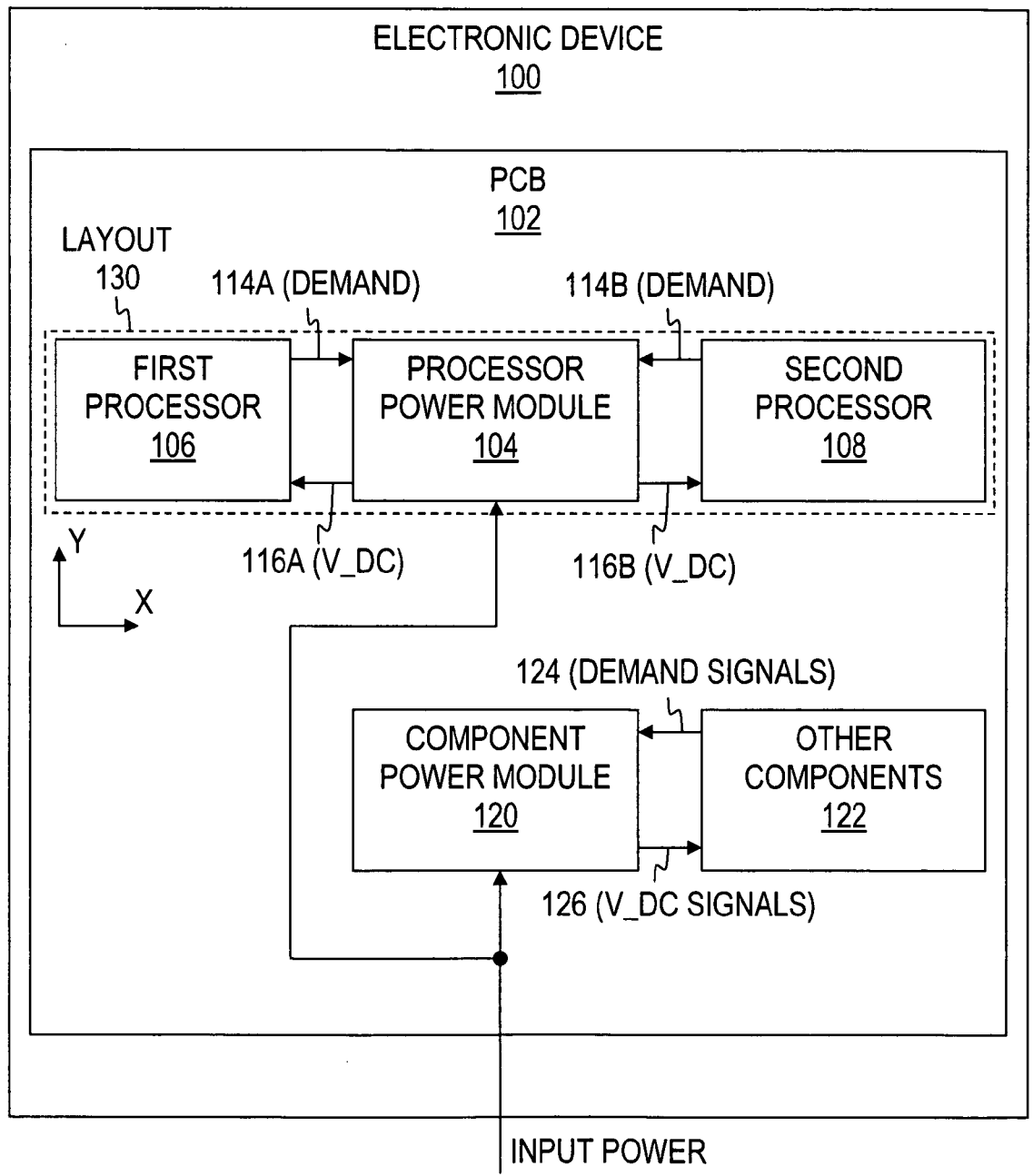
FIG. 1 shows an electronic device in accordance with embodiments of the invention.

FIG. 1 shows an electronic device 100 in accordance with embodiments of the invention. As shown in FIG. 1, the electronic device 100 comprises a printed circuit board (PCB) 102. Mounted to the PCB 102 is a multi-processor power module 104 that provides power to a first processor 106 and a second processor 108. The multi-processor power module 104 and the processors 106 and 108 are arranged in a layout 130 that uses a predetermined amount of PCB space in the "Y" direction (e.g., approximately the length of the multi-processor power module 104 or the processors 106 and 108 in the Y direction) and a predetermined amount of PCB space in the "X" direction (e.g., approximately the length of the multi-processor power module 104 as well as the length of each of the processors 106 and 108 in the X direction).

The multi-processor power module 104 is mounted close to the processors 106 and 108 to improve the signal quality and the response time of communications between the multi-processor power module 104 and the processors 106 and 108. In some embodiments, the multi-processor power module 104 connects to each of the processors 106 and 108 via edge-card connections, compression connections, pin-and-socket connections, flexible connections or floating connections. Also mounted to the PCB is a component power module 120 that provides power to other components 122 of the electronic device 100.

As shown, both the multi-processor power module 104 and the component power module 120 receive an input power. The input power may be provided by at least one power source such as a battery, a fuel cell or an alternating current (AC) power adapter. In at least some embodiments, the input power provides a high voltage and a low current (compared to the voltage and current needed by the processors 106 and 108). Therefore, the multi-processor power module 104 is configured to convert the input power to appropriate voltage levels ("V_DC") and appropriate current levels for the processors 106 and 108. As shown, the multi-processor power module 104 provides a voltage V_DC 116A to the processor 106 and a voltage V_DC 116B to the processor 108. In at least some embodiments, the multi-processor power module 104 determines appropriate V_DC levels and current levels based on demand signals 114A and 114B. As used herein, a "demand" signal refers to a signal that indicates a processor's increasing or decreasing demand for power. As shown, the demand signal 114A is provided by the processor 106 to the multi-processor power module 104 and the demand signal 114B is provided by the processor 108 to the multi-processor power module 104.

In at least some embodiments, the processors 106 and 108 operate independently of each other. In such embodiments, the multi-processor power module 104 is configured to handle the dynamic power needs of both processors 106 and 108. Table 1 shown below illustrates the dynamic power needs of the processors 106 and 108 that are supported by the multi-processor power module 104.

TABLE 1

| Operative States | First Processor (106) | Second Processor (108) |
|---|---|---|
| (1) | Idle | Idle |
| (2) | Idle | Maximally Busy |
| (3) | Maximally Busy | Idle |
| (4) | Maximally Busy | Maximally Busy |

As shown in Table 1, the multi-processor power module 104 is configured to support at least the operative states: (1), (2), (3) and (4). As used herein, an "operative state" refers to a level of operation associated with one or more processors.

For example, a processor's operative state may be "powered off," "powered on," "idle," "intermediate," "maximally busy" or other operative states. In the operative state (1), both the processors 106 and 108 are idle. As used herein, the term "idle" refers to a processor that executes operating system instructions, but not application instructions. Also, the term "maximally busy" refers to an amount of power that is demanded when a processor is busy to a predetermined maximum degree and does not necessarily refer to a maximum amount of power that can be supported by a processor.

In the operative state (2), the processor 106 is idle and the processor 108 is maximally busy. In the operative state (3), the processor 106 is maximally busy and the processor 108 is idle. In the operative state (4), both processors 106 and 108 are maximally busy. The processors 106 and 108 also may operate at levels (states) other than idle and maximally busy such as intermediate operative levels. Thus, the multi-processor power module 104 is configured to support both the processors 106 and 108 regardless of the operative state and/or the power demanded by the processors 106 and 108. In at least some embodiments, the multi-processor power module 104 receives input power ranging from 12 volts to 48 volts and outputs approximately 1 volt and up to 100 amps for each of the processors 106 and 108. However, other multi-processor power module embodiments may receive a different input power and/or may output a different amount of voltage and current based on the design of the processors supported by the multi-processor power module 104 as well as the changing operational demands of the processors.

The component power module 120 is configured to convert the input power to appropriate voltage levels ("V_DC signals") 126 and appropriate current levels for one or more other components 122. In at least some embodiments, the component power module 120 regulates a voltage V_DC 126 and current levels based on one or more demand signals 124 received from the other components 122. If, for example, the electronic device 100 is a computer, the other components 122 comprise memory modules, a graphics controller, hard drives, networking components, fans, or removable disk drives such as a floppy-disk drive, a compact disk (CD) drive or a digital versatile disk (DVD) drive.

Embodiments of the invention are not limited to any particular electronic device or component configuration. Rather, embodiments implement a power module (e.g., the multi-processor power module 104) that is dedicated to the power needs of multiple processors and at least one other power module (e.g., the component power module 120) to regulate power for other components (i.e., any power consuming component that is not supported by the multi-processor power module 104).

Figure 2:
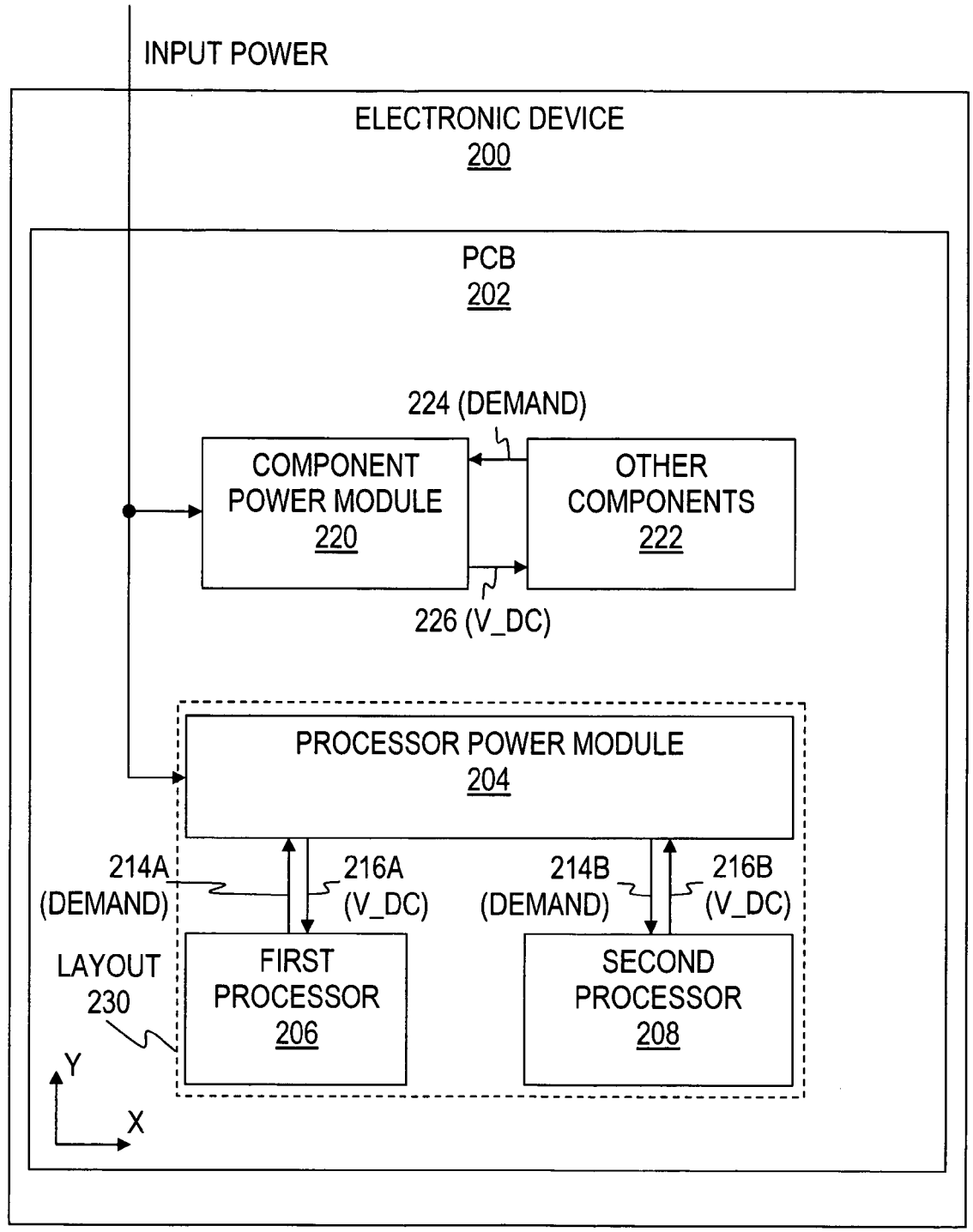
FIG. 2 shows an electronic device in accordance with alternative embodiments of the invention.

FIG. 2 shows an electronic system 200 in accordance with other embodiments of the invention. As shown in FIG. 2, the electronic system 200 comprises a PCB 202 having attached thereto a multi-processor power module 204 coupled to a first processor 206 and a second processor 208. Also attached to the PCB 202 is a component power module 220 coupled to other components 222 of the electronic device 200.

The multi-processor power module 204 and the processors 206 and 208 are arranged in a layout 230 that uses a predetermined amount of PCB space in the "Y" direction (e.g., approximately the length of the multi-processor power module 104 and either of the processors 106 and 108 in the Y direction) and a predetermined amount of PCB space in the "X" direction (e.g., approximately the length of the multi-processor power module 104 or the length of both processors 106 and 108 in the X direction).

The multi-processor power module 204 and the component power module 220 function in a manner similar to the multi-processor power module 104 and the component power module 120 previously described in FIG. 1. FIG. 2 illustrates that embodiments may implement multi-processor power modules (e.g., the modules 104 and 204) that differ in size, shape, locations of inputs or locations of outputs. In like manner, the layouts (e.g., layout 130 and 230) of different embodiments may differ. For example, in FIG. 2, the multi-processor power module 204 is configured to be placed above (or below) two side-by-side processors 206 and 208. Therefore, sets of input pins (e.g., to receive demand signals) and V-DC output pins of the multi-processor power module 204 may be positioned on one side of the multi-processor power module 204. Alternatively, as shown in FIG. 1, the multi-processor power module 104 is configured to be placed between two processors 106 and 108. Therefore, sets of demand signal input pins and V-DC output pins may be positioned on opposite sides of the multi-processor power module 104.

Figure 3:
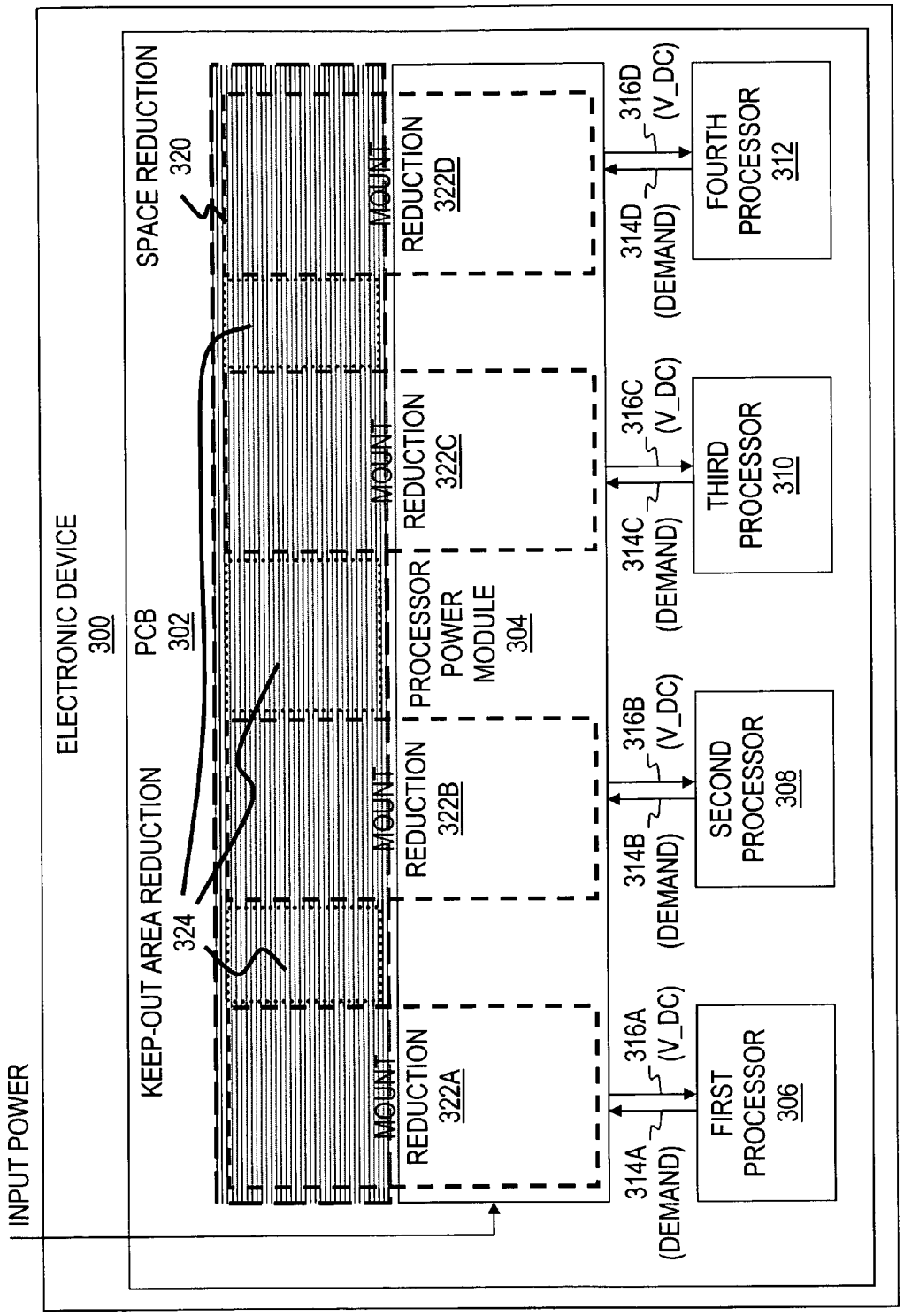
FIG. 3 shows an electronic device in accordance with alternative embodiments of the invention.

FIG. 3 shows an electronic device 300 in accordance with alternative embodiments of the invention. As shown in FIG. 3, the electronic device 300 comprises a PCB 302. Mounted to the PCB 302 is a multi-processor power module 304 that provides power to a first processor 306, a second processor 308, a third processor 310 and a fourth processor 312. The electronic device 300 also may comprise one or more component power modules that provide power to other components (not shown for convenience) of the electronic device 300.

The multi-processor power module 304 functions in a manner similar to the multi-processor power module 104 previously described in FIG. 1 and is configured to regulate power dynamically to the processors 306, 308, 310 and 312 based on demand signals 314A-314D. FIG. 3 illustrates space reduction 320, mount reductions 322A-322D and keep-out area reductions 324 that are accomplished by implementing a multi-processor power module 304 that is shared by a plurality of processors (e.g., the processors 306, 308, 310 and 312) rather than implementing separate power modules for each processor 306, 308, 310 and 312. The space reduction 320 (illustrated by the horizontal lines) is accomplished, at least in part, by eliminating functions and components (e.g., input filters, input connectors, magnetics and heatsinks) that are redundant when implementing separate power modules (referred to as "dedicated" or "uni" processor power modules herein) for each processor 306, 308, 310 and 312. Thus, the physical size of the multi-processor power module 304 (at least in the X and Y directions previously described) is configured to be less than the space requirement of implementing uni-processor power modules for each processor 306, 308, 310 and 312.

The mount reductions 322A-322D are accomplished by implementing a single mount for the multi-processor power module 304. Mounting the multi-processor power module 304 to the PCB 302 involves fewer mounting holes than mounting uni-processor power modules for each processor 306, 308, 310 and 312 (i.e., mounting holes for multi-processor power modules are reduced by a factor of four). Reducing mounting holes, frees expensive PCB area for other uses such as routing signals. Also, the mount reductions 322A-322D reduce the amount of hardware (e.g., mounts, heatsinks, or connectors) and labor involved in assembling the electronic device 300 (i.e., mounting the processor power module 304 employs one mount assembly while mounting four uni-processor power modules employs four mount assemblies) thereby reducing costs.

The keep-out area reductions 324 (i.e., locations on the PCB 302 where traces are avoided) are accomplished by implementing the multi-processor power module 304 rather than implementing separate uni-processor power modules for each processor 306, 308, 310 and 312. Reducing keep-out areas frees expensive PCB area for other uses such as routing signals. Thus, FIG. 3 shows at least three benefits (space reduction 320, mount reductions 322A-322D and keep-out area reductions 324) of implementing the multi-processor power module 304 to support the processors 306, 308, 310 and 312 rather than separate uni-processor power modules.

Figure 4:
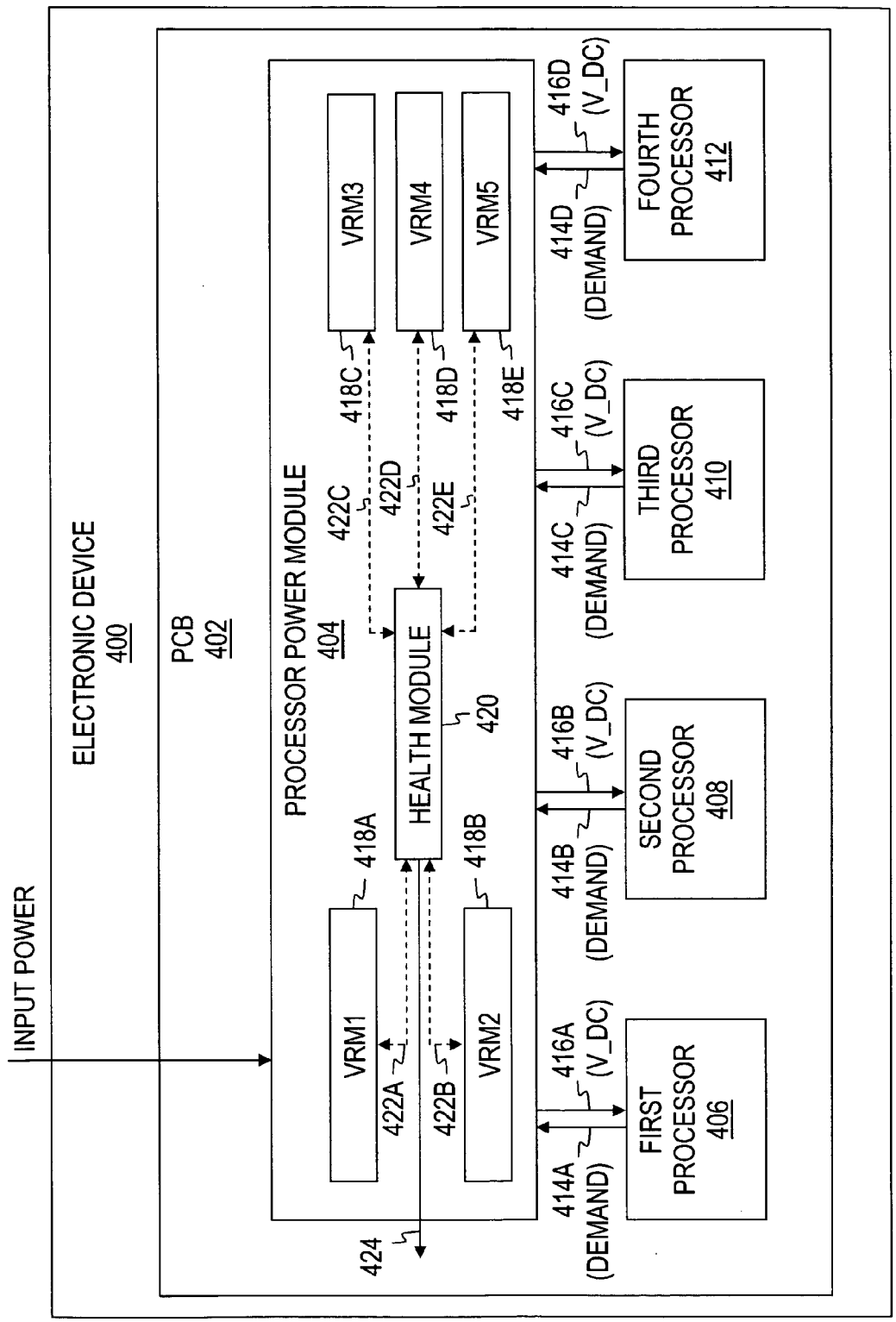
FIG. 4 shows an electronic device in accordance with alternative embodiments of the invention.

FIG. 4 shows an electronic device 400 in accordance with alternative embodiments of the invention. As shown in FIG. 4, the electronic device 400 comprises a PCB 402. Mounted to the PCB 402 is a multi-processor power module 404 that provides power to a first processor 406, a second processor 408, a third processor 410 and a fourth processor 412. The electronic device 400 also may comprise one or more component power modules that provide power to other components of the electronic device 400 (not shown for convenience).

The multi-processor power module 404 functions in a manner similar to the multi-processor power module 104 previously described in FIG. 1 and is configured to regulate power dynamically to the processors 406, 408, 410 and 412 based on the demand signals 414A-414D. FIG. 4 illustrates that the multi-processor power module 404 may comprise a plurality of replaceable voltage regulation modules (VRMs) 418A-418E.

As shown, five VRMs 418A-418E are used to support four processors 406, 408, 410 and 412, thus providing redundancy within the multi-processor power module 404. If one of the VRMs 418A-418E fails, the multi-processor power module 404 is able to continue providing uninterrupted power to the processors 406, 408, 410 and 412 using the remaining functional VRMs. The failed VRM is replaceable by simply removing (e.g., unplugging) the failed VRM from the multi-processor power module 404 and inserting (e.g., plugging in) a functional VRM in the failed VRM's place.

In at least some embodiments, the multi-processor power module 404 also comprises a health module 420 coupled to the VRMs 418A-418E. The health module 420 is configured to detect a health status 422A-422E of each of the VRMs 418A-418E. If one of the VRMs 418A-418E has failed or is otherwise unhealthy, the health module 420 is direct the remaining (healthy) VRMs to compensate for the failed VRM. The health module 420 also may generate an alert signal 424 in response to detecting at least one failed VRM. The alert signal 424 is implemented to notify a user that at least one VRM has failed or is otherwise unhealthy.

Figure 5:
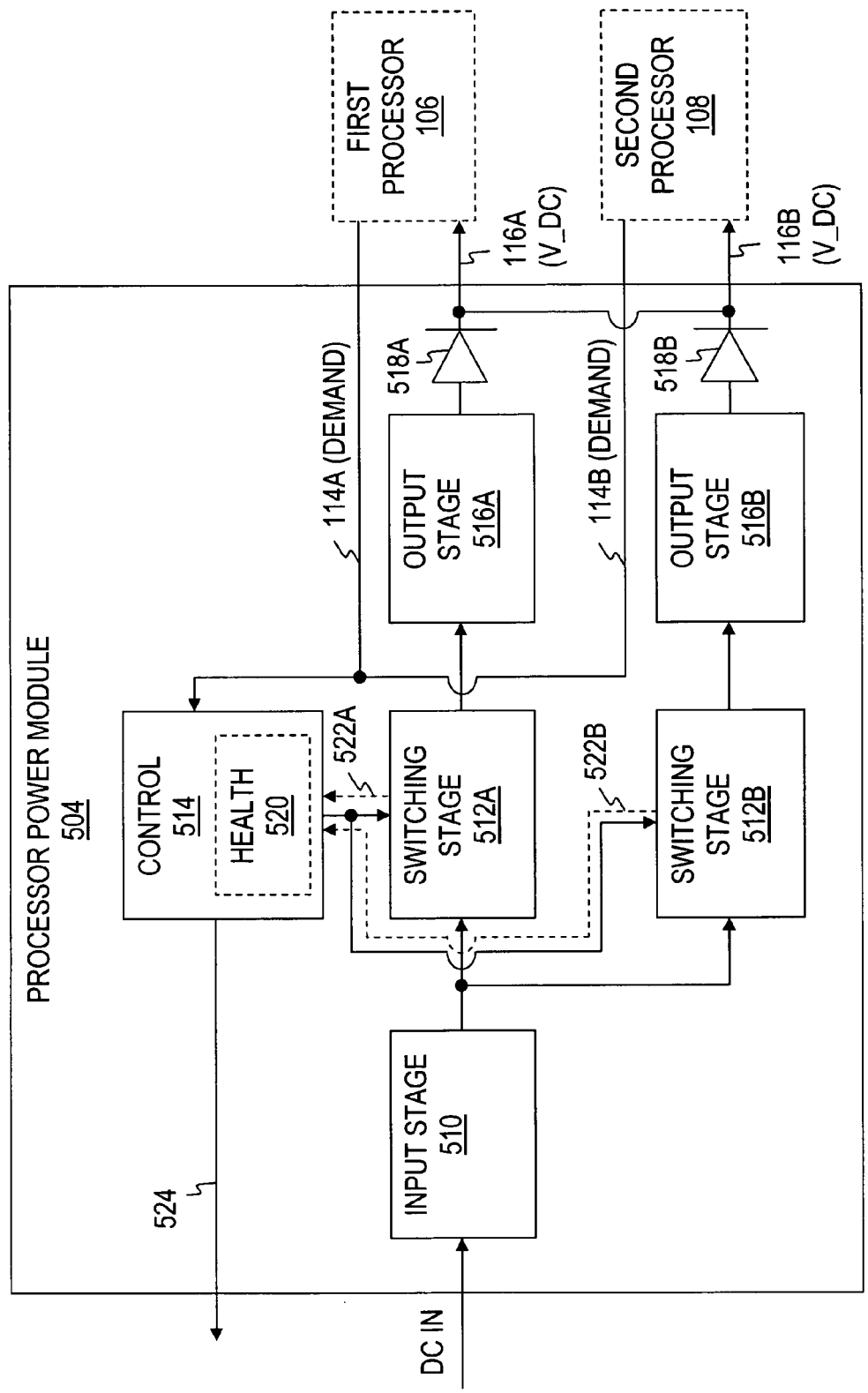
FIG. 5 shows a processor power module in accordance with embodiments of the invention.

FIG. 5 shows a multi-processor power module 504 in accordance with embodiments of the invention. As shown in FIG. 5, the multi-processor power module 504 comprises an input stage 510 coupled to multiple switching stages 512A and 512B. Each of the switching stages 512A and 512B couples to an associated output stage (as shown, the switching stage 512A couples to the output stage 516A and the switching state 512B couples to the output stage 516B). Also, each of the switching stages 512A and 512B couples to and receives input from control logic 514.

In at least some embodiments, the control logic 514 controls the amount of power output from each of the switching stages 512A and 512B based on demand signals (e.g., the demand signals 114A and 114B) received from processors coupled to the multi-processor power module 504 (e.g., the processors 106 and 108). For example, the control logic 514 may provide a response (e.g., a pulse width modulation (PWM) duty-cycle) that controls the amount of power output from each switching stage 512A and 512B based on the demand signals 114A and 114B. Table 2 shown below illustrates a duty-cycle control provided by the control logic 514 based on demand signals.

TABLE 2

| CONTROL CONFIG. | DUTY-CYCLE TO 512A (%) | DUTY-CYCLE TO 512B (%) | DEMAND 114A | DEMAND 114B |
| --- | --- | --- | --- | --- |
| (1) | 25-33% | 25-33% | IDLE | IDLE |
| (2) | 50% | 50% | IDLE | MAX |
| (3) | 50% | 50% | MAX | IDLE |
| (4) | 75-83% | 75-83% | MAX | MAX |

As shown in Table 2, the control logic 514 is configured to support the control configurations: (1), (2), (3) and (4). In the control configuration (1), both demand signals 114A and 114B indicate that the processors 106 and 108 are idle. Accordingly, the control logic 514 directs the modulation duty-cycles implemented by each of the switching stages 512A and 512B to approximately a 25-33% duty-cycle. In the control configuration (2), the demand signal 114A indicates that the processor 106 is idle and the demand signal 114B indicates that the processor 108 is maximally operative. Accordingly, the control logic 514 directs the modulation duty-cycles implemented by each of the switching stages 512A and 512B to approximately a 50% duty-cycle.

In the control configuration (3), the demand signal 114A indicates that the processor 106 is maximally operative and the demand signal 114B indicates that the processor 108 is idle. Accordingly, the control logic 514 directs the modulation duty-cycles implemented by each of the switching stages 512A and 512B to approximately a 50% duty-cycle. In the control configuration (4), the demand signals 114A and 114B indicate that the processors 106 and 108 are maximally operative. Accordingly, the control logic 514 directs the modulation duty-cycles implemented by each of the switching stages 512A and 512B to approximately a 75-83% duty-cycle.

While Table 2 illustrates the operation of one control logic embodiment, other embodiments are possible. For example, the response (e.g., the modulation duty-cycle) provided by the control logic 514 may change based on the input power available or other considerations. Also, the control logic 514 may not provide the same response to both switching stages 512A and 512B, but may control the switching stages individually. If the demand signals 114A and 114B indicate operative states other than "idle" and "maximally operative" for each of the processors 106 and 108, the control logic 514 provides an appropriate response to the switching stages 512A and 512B. In this manner, power is provided to the processors 106 and 108 efficiently and quickly, even if the operative states of the processors 106 and 108 are changing.

Among other things, FIG. 5 illustrates embodiments that replicate some circuitry (e.g., the switching stages and the output stages) of the multi-processor power module 504 for each supported processor while other circuitry (e.g., the input stage and the control logic) is not replicated for each supported processor. In at least some embodiments, the replicated circuitry comprises components that are predetermined to have a likelihood of failure that is greater than a threshold amount (e.g., a likelihood of failure greater than 50% within the lifespan of an electronic device that implements the multi-processor power module 504). Although not shown in FIG. 5 for convenience, some multi-processor power module embodiments implement redundant replicated circuitry (e.g., at least one switching stage that is able to output sufficient power for multiple processors and/or three sets of switching stages and output stages rather than two sets).

As shown, the control logic 514 comprises a health component 520. The health component 520 interprets health status signals 522A-522B received by the control logic 514. In at least some embodiments, the health status signals 522A-522B are generated by the switching stages 512A and 512B. Additionally or alternatively, health status signals are generated by the input stage 510, the output stages 516A and 516B as well as within the control logic 514. If, for example, the health status signal 522A indicates the failure of the switching stage 512A, the health component 520 directs the switching stage 512B to compensate for the failure. Also, if one or more components of the multi-processor power module 504 fail, the health component 520 generates an alert signal 524. The alert signal 524 is implemented to notify a user that at least one component of the multi-processor power module 504 has failed or is otherwise unhealthy. Also, the alert signal 524 may provide failure details such as which component failed, when the failure occurred and whether the multi-processor power module 504 is able to continue functioning.

In at least some embodiments, the non-replicated circuitry comprise components that are predetermined to have a likelihood of failure that is less than a threshold amount. For example, the input stage 510 and the control logic 514 may each have a likelihood of failure that is less than 30% within the lifespan of an electronic device that implements the multi-processor power module 504. Thus, to reduce hardware components, assembly costs and size (i.e., to reduce an amount of PCB space needed to mount the multi-processor power module 504) of a multi-processor power module, a single input stage 510 and single control logic 514 is implemented. While other components may be eliminated, at least some multi-processor power module embodiments reduce the amount of input filters, input connectors, magnetics and heatsinks (compared to implementing separate power modules for each processor). Multi-processor power module embodiments may implement heatsinks that are oriented in a direction to facilitate the airflow within an electronic device.

Also, while the multi-processor power module 504 illustrates supporting two processors, other multi-processor power module embodiments may support four processors or any practical number of processors. Again, the location of inputs and outputs of the processor power module 504 may be predetermined to enable certain layout characteristics. As previously described, one possible layout (e.g., the layout 130) facilitates processors being placed on different sides of a multi-processor power module, while another possible layout (e.g., the layout 230) facilitates processors being placed on one side of a multi-processor power module. In at least some embodiments, the processors supported by a multi-processor power module are located near the inputs and outputs of the multi-processor power module to improve the reliability and response time of communications and power transmission between the multi-processor power module and supported processors. In this manner, at least some of the benefits of separate uni-processor power modules are obtained while reducing hardware, assembly costs and PCB space associated with implementing a separate uni-processor power module for each processor.

Figure 6:
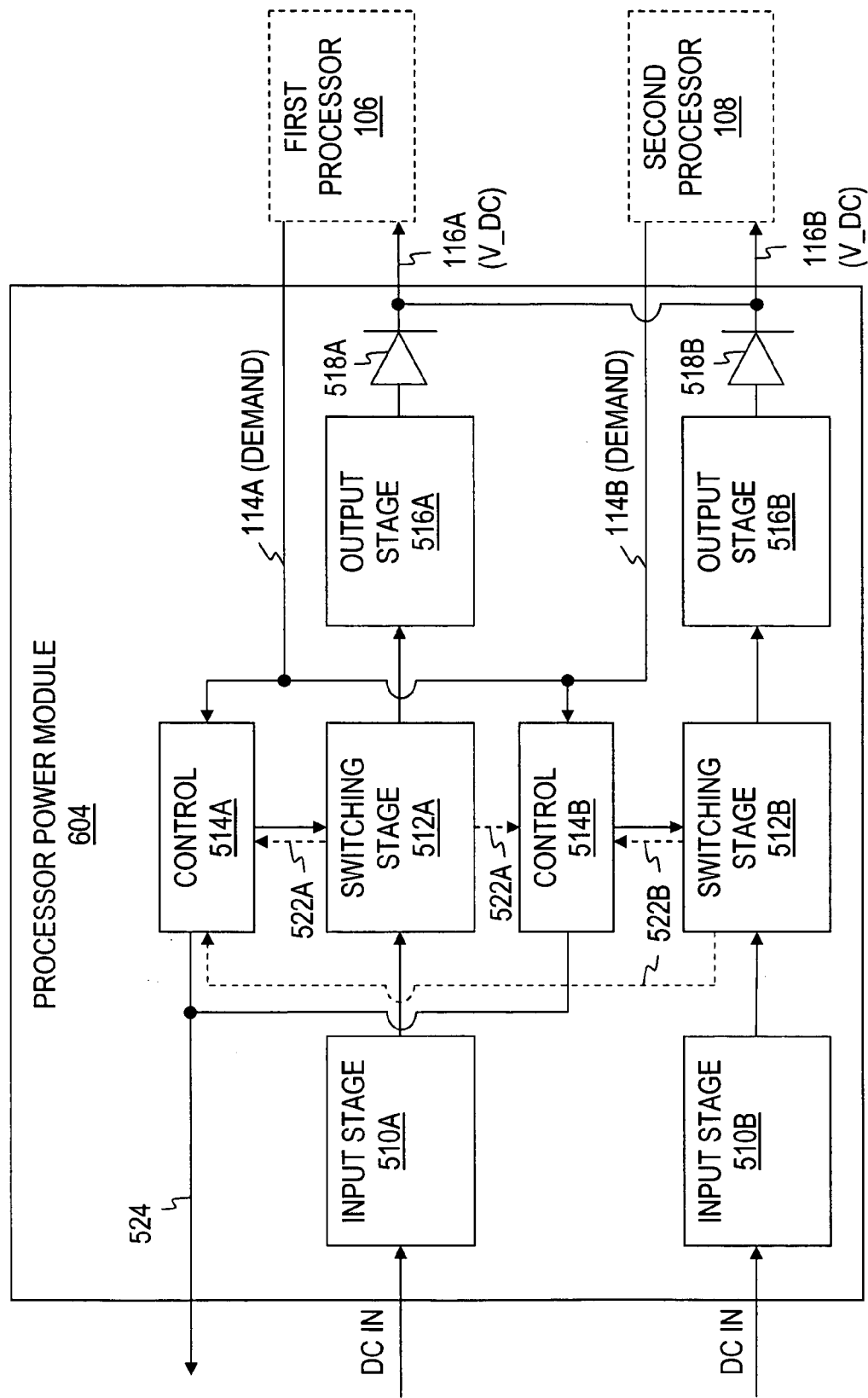
FIG. 6 shows a processor power modules in accordance with alternative embodiments of the invention.

FIG. 6 shows a multi-processor power module 604 in accordance with alternative embodiments of the invention. As shown in FIG. 6, the multi-processor power module 604 comprises an input stage (the input stages 510A and 510B), a switching stage (the switching stages 512A and 512B), an output stage (the output stages 516A and 516B) and control logic (the control logic 514A and 514B) for each of the supported processors 106 and 108. The demand signals 114A and 114B are combined and are provided to both control logics 514A and 514B to provide redundancy with respect to detecting the demand of the processors 106 and 108.

Also, the outputs of the output stages 516A and 516B are combined to provide redundancy with respect to providing output power. Thus, if one or more of the "A" components fail (e.g., the input stage 510A, the switching stage 512A, the output stage 516A or the control logic 514A), the "B" components are able to supply power to both of the processors 106 and 108. In such embodiments, each of the switching stages 512A and 512B is configured to provide sufficient power for multiple processors, if necessary. Also, each control logic 514A and 514B is able to detect if a failure occurs (e.g., each control logic 514A and 514B may implement a health component that interprets health status signals 522A and 522B). Thus, if an "A" component fails, the control logic 514B detects the failure and causes the switching logic 512B to provide power for both the processors 106 and 108 based on the demand signals 114A and 114B. Alternatively, if a "B" component fails, the control logic 514A detects the failure and causes the switching logic 512A to provide power for both the processors 106 and 108 based on the demand signals 114A and 114B. Also, each control logic 514A and 514B is able to generate an alert signal 524 as previously described.

As shown in FIG. 6, the alert signal 524 may be a combined output from each control logic 514A and 514B such that redundancy is provided with respect to the alert signal 524. Also, the health status signals 522A and 522B may be associated with other components other than the switching stages 512A and 512B (e.g., the input stages 510A-510B, the output stages 516A-516B or the control logic 514A-514B). In this manner, each control logic 514A and 514B is able to detect component failures of the multi-processor power module and adjust accordingly and/or notify a user of component failures.

Figure 7:
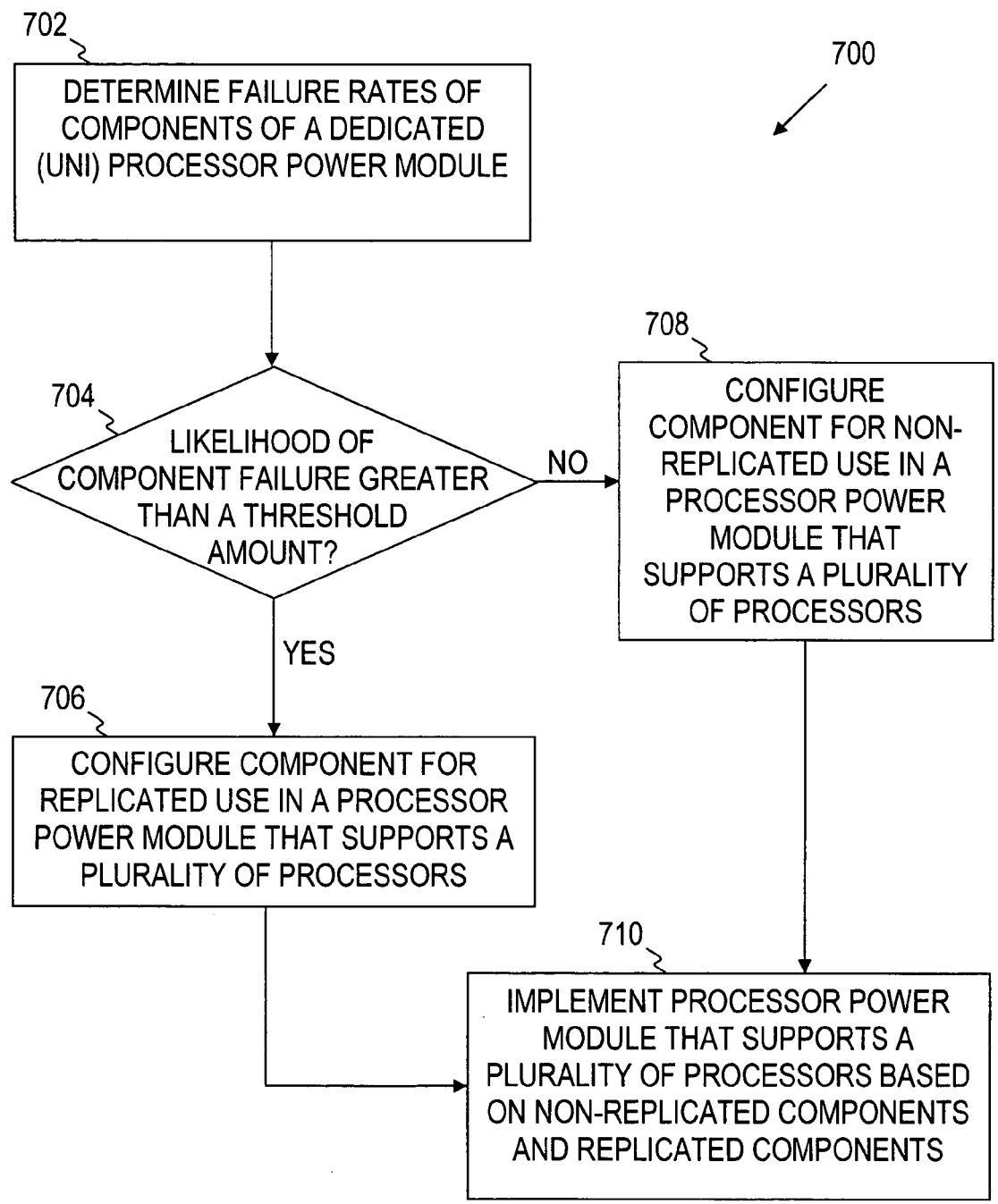
FIG. 7 shows a method in accordance with embodiments of the invention.

FIG. 7 illustrates a method 700 in accordance with embodiments of the invention. As shown in FIG. 7, the method 700 comprises determining failure rates of components of a uni-processor power module (block 702). If the likelihood of component failure is greater than a threshold amount (determination block 704), the component is configured for replicated use in a multi-processor power module that supports a plurality of processors (block 706). For example, the component (e.g., a switching stage or an output stage) may be replicated at least for each processor supported by the multi-processor power module.

If the likelihood of component failure is less than a threshold amount (determination block 704), the component is configured for non-replicated use in a multi-processor power module that supports a plurality of processors (block 708). Thus, hardware costs, assembly costs and occupied PCB space is reduced compared to implementing a uni-processor power module for each of the plurality of processors. Finally, the method 700 comprises implementing replicated components and non-replicated components in a multi-processor power module to support a plurality of processors (block 710). By using the method 700, a multi-processor power module is able to maintain at least some of the benefits of separate uni-processor power modules for each processor while reducing hardware costs, assembly costs and occupied PCB space. Also, redundant power can be supplied by providing more replicate components than supported processors. Alternatively, redundant power can be supplied by implementing a replicate component that, if necessary, is able to support multiple processors. In either case, if the replicate component fails, the remaining replicate components are able to continue providing power to a plurality of processors without interruption.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A multi-processor power module that is adapted to regulate power to a plurality of processors, comprising:
   components that are replicated at least for each of the plurality of processors; and
   control logic that is configured to detect a demand from each of the plurality of processors and to direct the replicated components to provide a regulated power based on the demand, the regulated power being output for sharing among the plurality of processors.

2. The multi-processor power module of claim 1 wherein the replicated components are determined to have a likelihood of failure that is greater than a threshold amount.

3. The multi-processor power module of claim 1 wherein the replicated components comprise switching stages.

4. The multi-processor power module of claim 1 wherein the replicated components comprise output stages.

5. The multi-processor power module of claim 1 wherein the control logic comprises a health component, the health component being configured to interpret health status signals from the replicated components and, if necessary, direct switching stages of the multi-processor power module to compensate for unhealthy components.

6. The multi-processor power module of claim 1 wherein replicated components are located on separate removable sub-modules.

7. The multi-processor power module of claim 1 wherein the control logic comprises a health component, the health component being configured to interpret health status signals received from replicated components and, if the health status signals indicate a component failure, assert an alert signal to notify a user.

8. The multi-processor power module of claim 1 wherein the multi-processor power module is configured to be positioned near the processors on a printed circuit board (PCB) of an electronic device, the position selected from a group of positions consisting of:
   the multi-processor power module being placed between the processors; and
   the multi-processor power module being placed on one side of all the processors.

9. The multi-processor power module of claim 1 wherein the multi-processor power module is implemented in a computer.

10. An electronic device, comprising:
    a plurality of processors;
    a multi-processor power module that couples to the plurality of processors, the multi-processor power module detects a demand from each of the plurality of processors and provides a regulated power based on the demand, the regulated power being shared by the plurality of processors; and
    a component power module that couples to components other than the plurality of processors and that regulates power to the components.

11. The electronic device of claim 10 further comprising a printed circuit board (PCB) that supports the multi-processor power module and the plurality of processors, wherein the multi-processor power module is configured to be positioned between the plurality of processors on the PCB.

12. The electronic device of claim 10 further comprising a printed circuit board (PCB) that supports the multi-processor power module and the plurality of processors wherein the multi-processor power module is configured to be positioned to one side of all the plurality of processors on the PCB.

13. The electronic device of claim 10 wherein the multi-processor power module is configured to occupy a first amount of space on a printed circuit board (PCB), the first amount of space being a reduction of a predetermined second amount of space based on separate uni-processor power modules.

14. The electronic device of claim 10 wherein the multi-processor power module is mounted to a printed circuit board (PCB) via a mount assembly that uses a first amount of PCB mounting holes, the first amount of PCB mounting holes being a reduction of a predetermined second amount of PCB mounting holes based on separate uni-processor power modules.

15. The electronic device of claim 10 further comprising a printed circuit board (PCB) that supports the multi-processor power module and the plurality of processors, wherein the multi-processor power module reduces a predetermined amount of route keep-out areas on the PCB, the predetermined amount based on separate uni-processor power modules.

16. The electronic device of claim 10 wherein the processor power module directly connects to each of the plurality of processors via at least one connection type selected from the connection types consisting of edge-card connections, compression connections, pin-and-socket connections, flexible connections and floating connections.

17. A system, comprising:
    means for providing power to a plurality of processors on a printed circuit board (PCB) based on replicating components of a uni-processor power module; and
    means for combining the replicated components in a package that occupies a first amount of PCB space, the first amount of space being less than a predetermined second amount of PCB space associated with using uni-processor power modules to provide power to the plurality of processors.

18. The system of claim 17 further comprising means for automatically compensating for a replicated component that fails.

* * * * *